United States Patent [19]

Boucher et al.

[11] Patent Number: 4,805,937
[45] Date of Patent: Feb. 21, 1989

[54] HANDLER COVER AND SEAT COVER FOR A SHOPPING CART

[76] Inventors: Joan L. Boucher, 8121 Capistrano Ave., Canoga Park, Calif. 91304; Pamela Mitchell, 15223 Valleyheart Dr., Sherman Oaks, Calif. 91403

[21] Appl. No.: 168,923

[22] Filed: Mar. 16, 1988

[51] Int. Cl.$^4$ .............................................. A47C 31/00
[52] U.S. Cl. ............................... 280/33.992; 297/229
[58] Field of Search ............... 280/33.99 A, 33.99 B, 280/DIG. 4; 297/219, 229, 250, DIG. 6; 428/71; 224/155, 161; 446/227

[56] References Cited

U.S. PATENT DOCUMENTS

| | | | |
|---|---|---|---|
| 2,141,881 | 12/1938 | Schray | 280/651 |
| 2,220,150 | 11/1940 | Goldman | 280/641 |
| 2,508,670 | 5/1950 | Goldman | 280/33.99 B |
| 3,866,649 | 2/1975 | Bringmann | 280/33.99 A |
| 3,909,034 | 9/1975 | Trubiano | 280/33.99 A |
| 3,993,319 | 11/1976 | Day | 280/33.99 A |
| 4,655,502 | 4/1967 | Houllis | 280/33.99 B |

*Primary Examiner*—Charles A. Marmor
*Assistant Examiner*—Richard Camby
*Attorney, Agent, or Firm*—Jerry T. Kearns

[57] ABSTRACT

A handle cover for a shopping cart is formed from a padded fabric strip. VELCRO fasteners are provided for securing the strip around the handle of a conventional shopping cart. The cover provides protection against germs, dirt and disease to small children riding in the shopping cart child seat. Various toys for the amusement of the child may be secured to the fabric cover. A seat cover for providing added protection and comfort to a child riding in a shopping cart seat includes strap fasteners for attachment to the handle cover. The seat cover and handle cover may be folded to compact sizes for convenient storage and transportation.

2 Claims, 5 Drawing Sheets

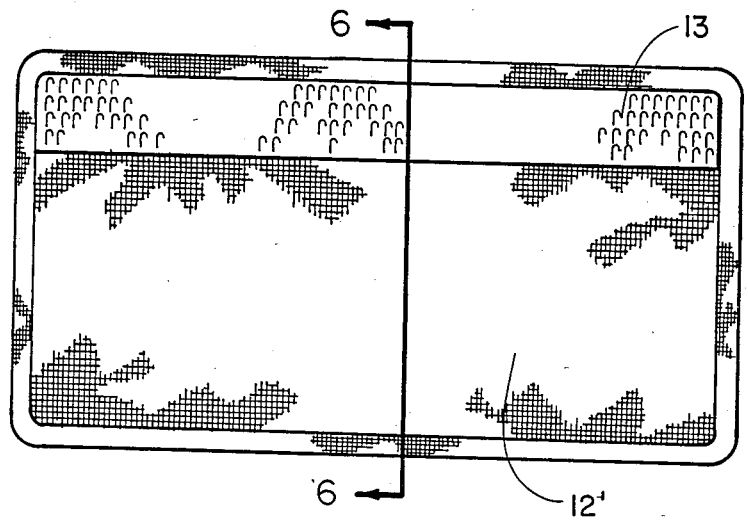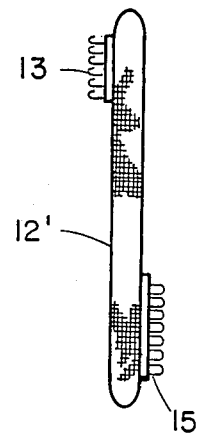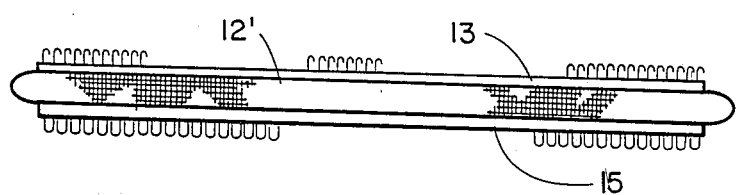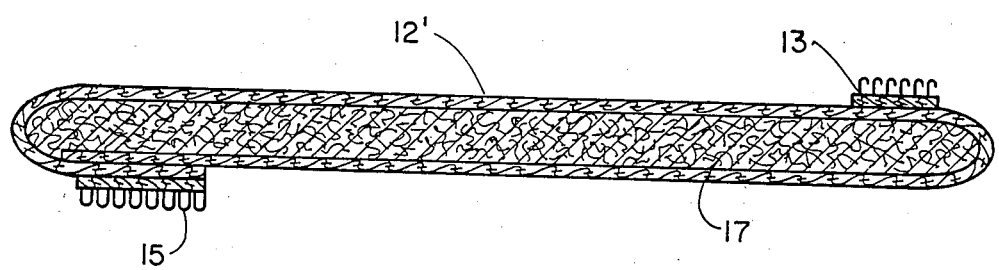
FIG. 3   FIG. 4
FIG. 5
FIG. 6

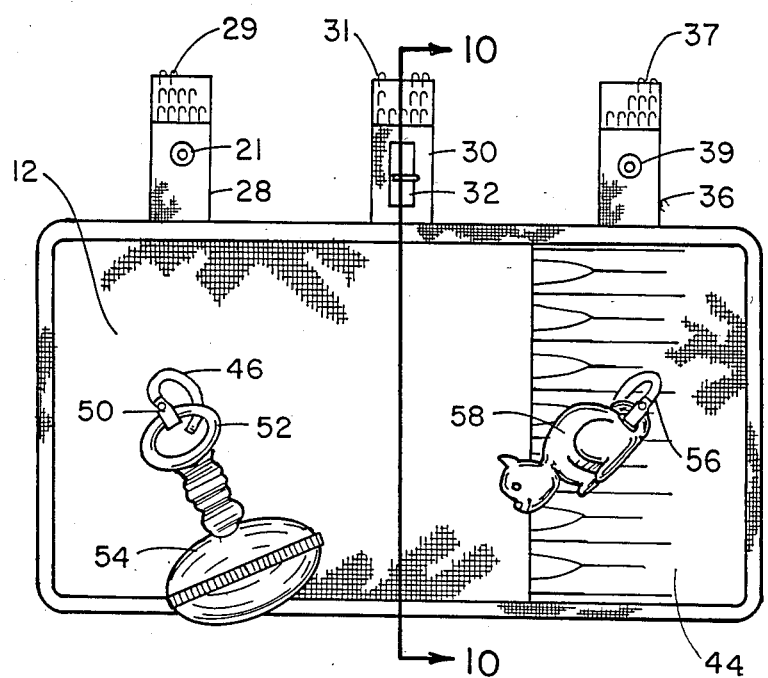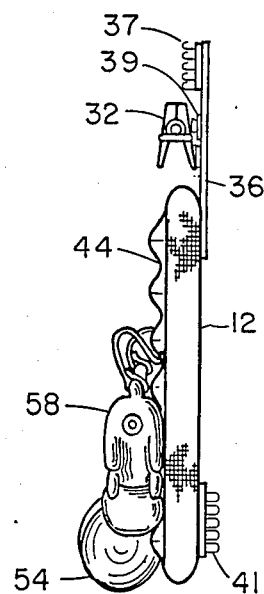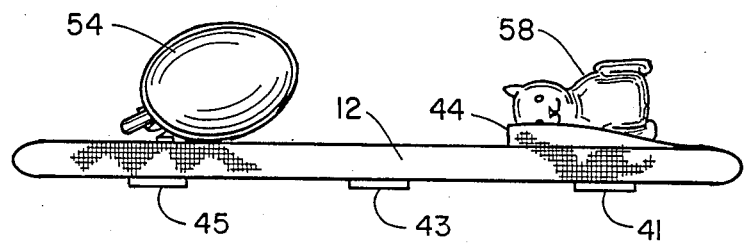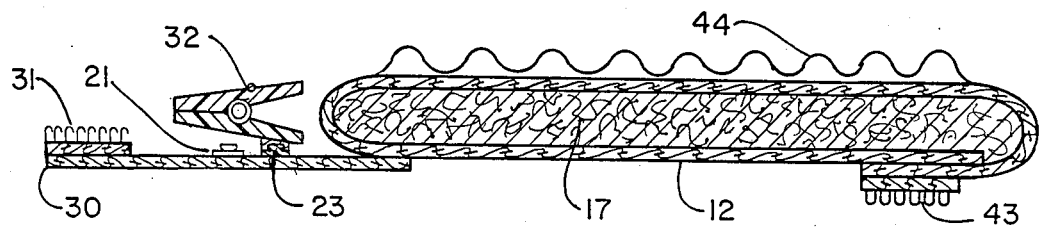

HANDLER COVER AND SEAT COVER FOR A SHOPPING CART

BACKGROUND OF THE INVENTION

1. Field of the Invention

The present invention relates to handle and seat covers, and more particularly pertains to a handle cover and seat cover for a conventional shopping cart. Infants and small children frequently ride in the infant seat provided on conventional shopping carts. These small children grip the handle of the shopping cart, which has been contacted by numerous individuals and other children. Small children, and especially babies, also like to put their mouths on the shopping cart handle. These infants also frequently put their hands in their mouth after contacting the shopping cart handle. These behavior characteristics of infants and small children creates a hazard of the transmission of dirt, germs and disease between individuals. Also, the infant seats of conventional shopping carts are formed from hard plastic or rigid wire components. These seats are frequently soiled and are also uncomfortable for the rider. In order to solve these problems, the present invention provides handle and seat covers which may be easily transported and quickly installed on child seats of conventional shopping carts.

2. Description of the Prior Art

Various types of handle and seat covers are known in the prior art. A typical example of such a handle cover is to be found in U.S. Pat. No. 2,141,881, which issued to W. Schray on Dec. 27, 1938. This patent discloses a shopping cart having a metal U-shaped handle provided with a covering grip. U.S. Pat. No. 2,220,150, which issued to S. Goldman on Nov. 5, 1940, discloses a folding cart provided with a U-shaped handle having a grip covering. U.S. Pat. No. 2,508,670, which issued to S. Goldman on May 23, 1950, discloses a baby seat for attachment to shopping carts. This removable baby seat is formed from rigid wire struts and hard sheet metal. U.S. Pat. No. 3,909,034, which issued to A. Trubiano on Sept. 30, 1975, discloses a shopping cart having a baby seat formed from rigid wire struts. A handle of the shopping cart is provided with hooks for supporting various articles. U.S. Pat. No. 3,993,319, which issued to G. Day on Nov. 23, 1976, discloses a check writing desk for a shopping cart. The desk is formed from a flat sheet of rigid material which is pivotally mounted for movement between operative and storage positions.

While the above mentioned devices are suited for their intended usage, none of these devices provide a shopping cart handle cover which may be quickly installed and folded to a compact size for storage and transportation. Additionally, none of the aforesaid devices discloses the use of a foldable seat cover in conjunction with a handle cover adapted for use with conventional shopping carts. Inasmuch as the art is relatively crowded with respect to these various types of handle and seat covers, it can be appreciated that there is a continuing need for and interest in improvements to such handle and seat covers, and in this respect, the present invention addresses this need and interest.

SUMMARY OF THE INVENTION

In view of the foregoing disadvantages inherent in the known types of handle and seat covers now present in the prior art, the present invention provides an improved handle cover and seat cover for a shopping cart. As such, the general purpose of the present invention, which will be described subsequently in greater detail, is to provide a new and improved handle cover and seat cover for a shopping cart which has all the advantages of the prior art handle and seat covers and none of the disadvantages.

To attain this, representative embodiments of the concepts of the present invention are illustrated in the drawings and make use of a padded fabric strip. VELCRO fasteners are provided for securing the strip around the handle of a conventional shopping cart. The cover provides protection against germs, dirt and disease to small children riding in the shopping cart child seat. Various toys for the amusement of the child may be secured to the fabric cover. A seat cover for providing added protection and comfort to a child riding in a shopping cart seat includes strap fasteners for attachment to the handle cover. The seat cover and handle cover may be folded to compact sizes for convenient storage and transportation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved handle cover and seat cover for a shopping cart which has all the advantages of the prior art handle and seat covers and none of the disadvantages.

It is another object of the present invention to provide a new and improved handle cover and seat cover for a shopping cart which may be easily and efficiently manufactured and marketed.

It is a further object of the present invention to provide a new and improved handle cover and seat cover for a shopping cart which is of a durable and reliable construction.

An even further object of the present invention is to provide a new and improved handle cover and seat cover for a shopping cart which is susceptible of a low cost of manufacture with regard to both materials and labor, and which accordingly is then susceptible of low prices of sale to the consuming public, thereby making such handle and seat covers economically available to the buying public.

Still yet another object of the present invention is to provide a new and improved handle cover and seat cover for a shopping cart which provides in the apparatuses and methods of the prior art some of the advantages thereof, while simultaneously overcoming some of the disadvantages normally associated therewith.

Still another object of the present invention is to provide a new and improved handle cover and seat cover for a shopping cart for protecting small children against the transmission of infectious and contagious diseases.

Yet another object of the present invention is to provide a new and improved handle cover and seat cover for a shopping cart which has facilities for amusing small children and provides enhanced comfort.

Even still another object of the present invention is to provide a new and improved handle cover and seat cover for a shopping cart which may be quickly and easily installed and removed and may be folded to a compact size for storage and transportation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of a modified form of handle cover.

FIG. 4 is an end view of the modified form of handle cover of FIG. 3.

FIG. 5 is a side view of the modified form of handle cover of FIG. 3.

FIG. 6 is a cross sectional view, taken along line 6—6 of FIG. 3.

FIG. 7 is a plan view of the handle cover of FIG. 1, illustrated in an open flat position.

FIG. 8 is an end view of the handle cover of FIG. 7.

FIG. 9 is a side view of the handle cover of FIG. 7.

FIG. 10 is a cross sectional view taken along line 10—10 of FIG. 7.

DESCRIPTION OF THE PREFERRED EMBODIMENT

Figure 1:
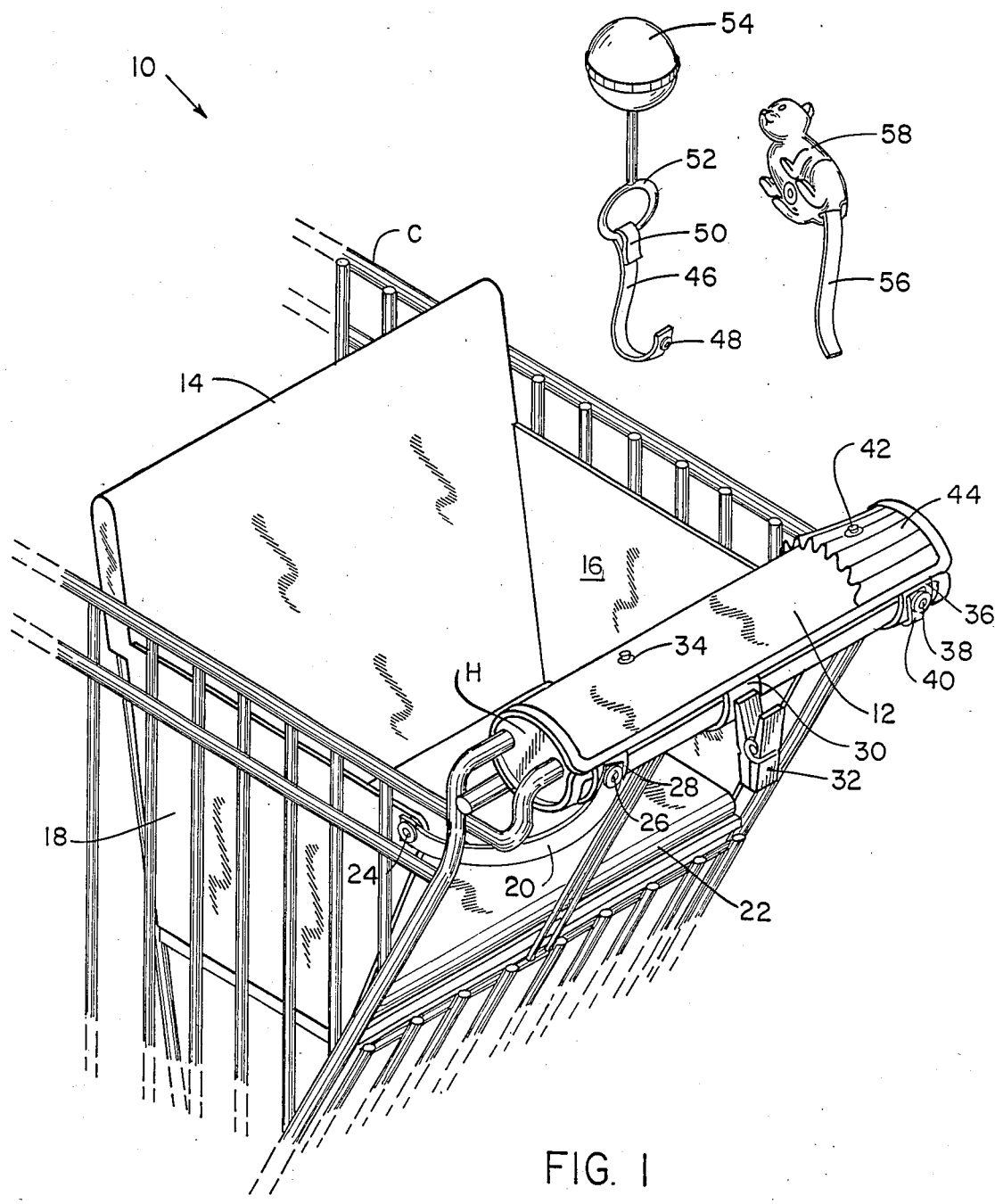
FIG. 1 is a perspective view of the handle cover and seat cover of the present invention installed on the infant seat of a conventional shopping cart.

With reference now to the drawings, and in particular to FIG. 1 thereof, a new and improved handle cover and seat cover for a shopping cart embodying the principles and concepts of the present invention and generally designated by the reference numeral 10 will be described.

More specifically, it will be noted that the first embodiment 10 of the invention includes a handle cover 12 formed from an elongated rectangular strip of a washable, foldable, padded fabric material. A foldable seat cover having a back portion 14, side panel portions 16 and 18 and a bottom portion 22, is also formed from a washable padded fabric material. The seat cover is releasably secured to the handle cover 12 by a pair of straps 20 and 40. These straps are secured by cooperating snap fasteners on the opposed outer front top corner portions of the side walls 16 and 18 of the seat cover. The illustrated strap 20 has a first snap fastener 24 which engages a cooperating fastener on the side panel 18, and a second snap fastener 26 which engages a cooperating fastener on the handle cover 12. The opposite strap 40 has a snap fastener 38 which also engages a cooperating fastener on the handle cover 12. The handle cover 12 is dimensioned so as to fold around and completely cover the handle H of a conventional shopping cart C. The fabric handle cover 12 is secured in position by spaced VELCRO fastening straps 28, 30 and 36. The constructional details of these VELCRO fastening straps will be described subsequently in greater detail. The fabric cover 12 is provided with a snap fastener 24 for engagement with a fastener 48 provided on a strap 46 which is removably secured by a snap loop 50 to the ring 52 of a toy rattle 54. An additional snap 42 is provided for engagement with a snap securing strap 56 of a squeeze toy animal 58. These, and various other amusement devices may be removably secured to the fabric cover 12 to provide amusement to infants and children riding in the shopping cart C. An elastic fabric storage pouch is formed at one end of the fabric cover 12 for storage of these various amusement devices. A small clothes pin 32 is removably secured to the central VELCRO fastening strap 30 of the handle cover 12 by cooperating snap fasteners. The clothes pin 32 may be utilized to hold shopping lists or various other articles.

Figure 2:
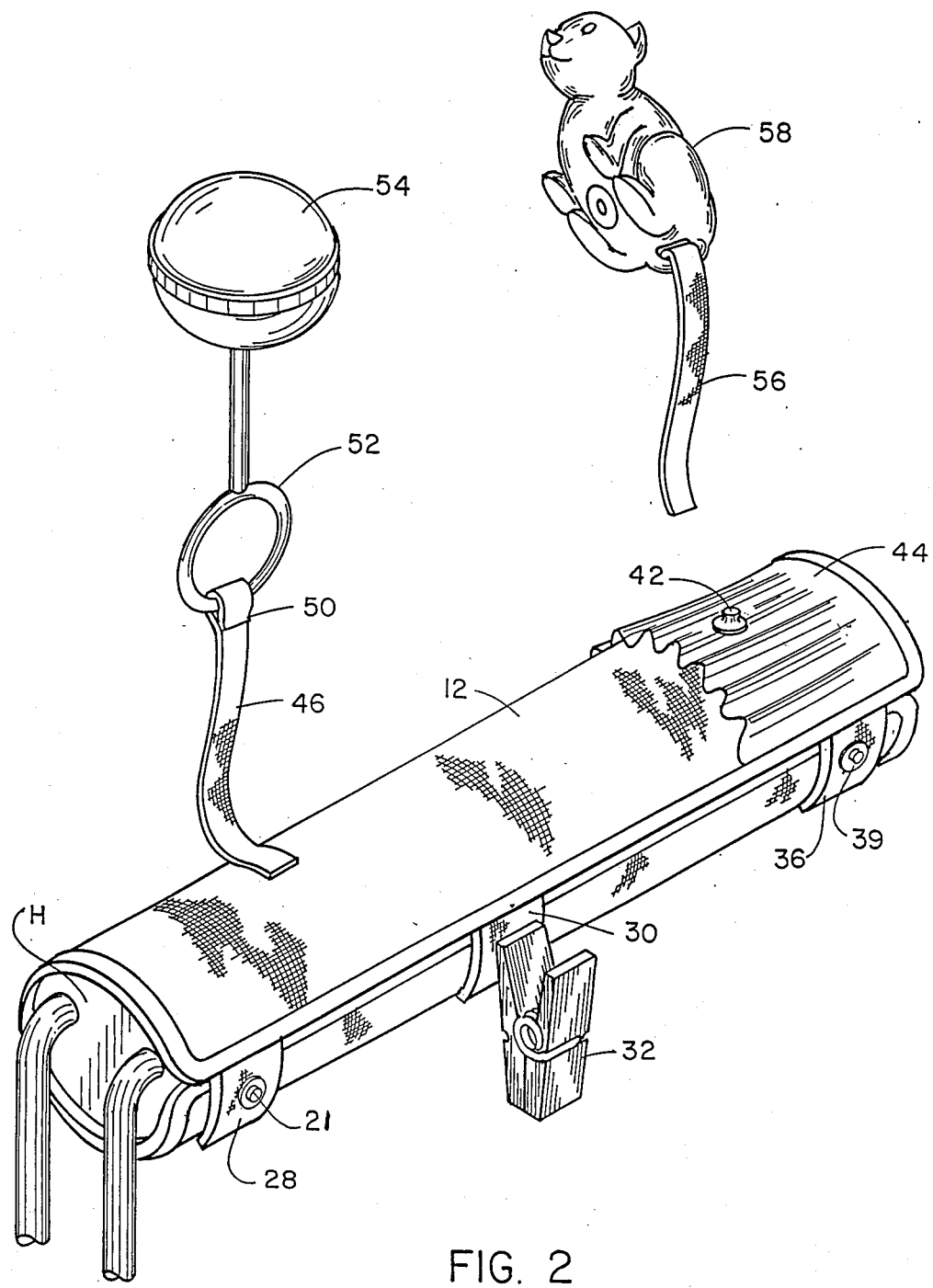
FIG. 2 is a perspective view of the handle cover of the present invention.

The perspective view of the handle cover 12 provided in FIG. 2 illustrates the snap fasteners 25 and 39 on the VELCRO attaching straps 28 and 36. As described with reference to FIG. 1, these snap fasteners cooperate with the snaps 26 and 38 on the seat cover securing straps 20 and 40.

In FIG. 3, a slightly modified form of handle cover 12' is illustrated. The cover 12' is formed from a foldable padded fabric washable material. An elongated hook VELCRO fastening strip 13 is formed on the upper surface of the cover 12', adjacent one longitudinal side edge thereof.

As shown in FIG. 4, a second elongated cooperating loop VELCRO fastening strip 15 is provided on a bottom surface of the fabric cover 12', for cooperation with the hook VELCRO fastening strip 13. By folding the cover 12' around a shopping cart handle, the cover 12' may be secured in position by engagement of the hook fasteners 13 with the loop fasteners 15.

In FIG. 5, a side view of the modified form of handle cover 12' is provided. The hook VELCRO fastening strip 13 and cooperating loop VELCRO fastening strip 15 extend along opposite longitudinal side edges of the cover 12', and are on opposite sides thereof.

In FIG. 6, a cross sectional view taken along line 6—6 of FIG. 3 is provided, which illustrates the padded filler material 17 of the cover 12'. The fabric cover 12' and filling material 17 may be of any conventional type, but are preferably machine washable.

In FIG. 7, a plan view of the first form of fabric handle cover 12 is provided. The VELCRO securing straps 28, 30 and 36 are spaced along one longitudinal side edge of the cover 12, and extend transversely outwardly thereof. Each of the VELCRO fastening straps 28, 30 and 36 are provided at a top end portion with VELCRO hook fasteners 29, 31 and 37. As previously described with reference to FIG. 2, the outermost VELCRO fastening straps 28 and 36 are provided with snap fasteners 21 and 39 for cooperation with the seat cover securing straps 20 and 40.

As shown in the end view of FIG. 8, a short strip of loop VELCRO material 41 is secured on the bottom surface of the cover 12, in alignment with the strap 36. When the cover 12 is folded around the handle of a shopping cart, the hook VELCRO fastening material 37 on the strap 36 engages with the loop VELCRO fastening material 41.

As shown in the side view of FIG. 9, similar short rectangular strips of loop fastening materials 43 and 45 are secured to the bottom surface of the cover 12, in alignment with the straps 30 and 28. Thus, it may be understood that the straps 28, 30 and 36 are secured in spaced alignment along one longitudinal side edge on the bottom surface of the cover 12, and cooperating loop VELCRO fastening strips 41, 43 and 45 are secured in aligned relationship to the bottom surface of the fabric cover 12 in spaced relation along the opposite longitudinal side edge.

In FIG. 10, a cross sectional view, taken along line 10—10 of FIG. 7 is provided. The clothes pin 32 is secured to the strap 30 by a snap fastener connection 23.

Figure 11:
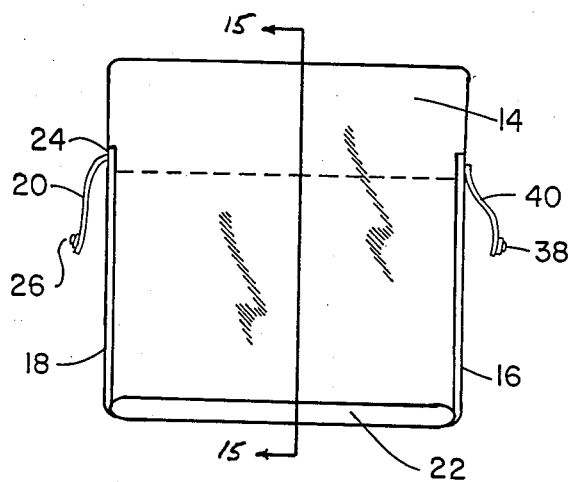
FIG. 11 is a front view of the seat cover folded to an open position.

In FIG. 11, a front view of the seat cover in an open position is provided. The seat back 14 and seat bottom 22 are provided with a padding material to provide enhanced comfort to a child riding in the shopping cart seat. The fastening straps 20 and 40, for attachment to the handle cover 12, extend from opposite side panels 18 and 16.

Figure 12:
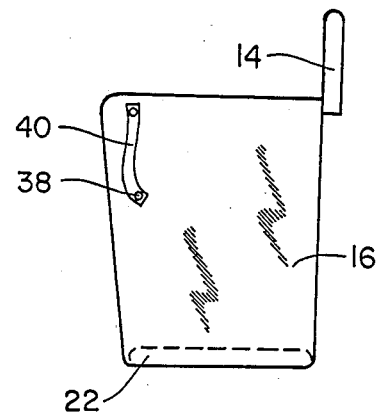
FIG. 12 is a side view of the seat cover folded to an open position.

In FIG. 12, a side view of the seat cover is provided.

Figure 13:
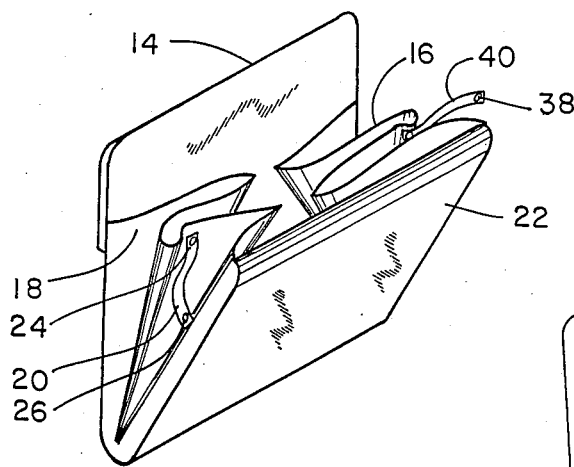
FIG. 13 is a perspective view of the seat cover folded to a semi-closed position.

As shown in FIG. 13, the seat cover may be folded to a compact storage size due to the flexible nature of the side panels 16 and 18.

Figure 14:
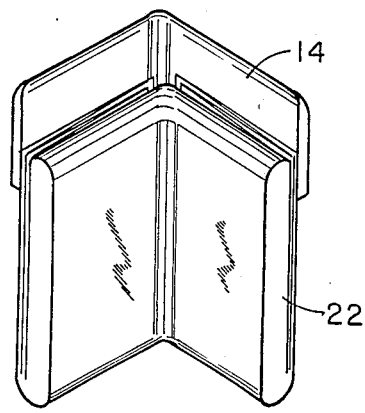
FIG. 14 is a perspective view of the seat cover folded to a compact storage position.

As shown in FIG. 14, the seat back 14 and seat bottom 22 portions may also be folded along a central longitudinal line to further reduce the storage size of the seat cover.

Figure 15:
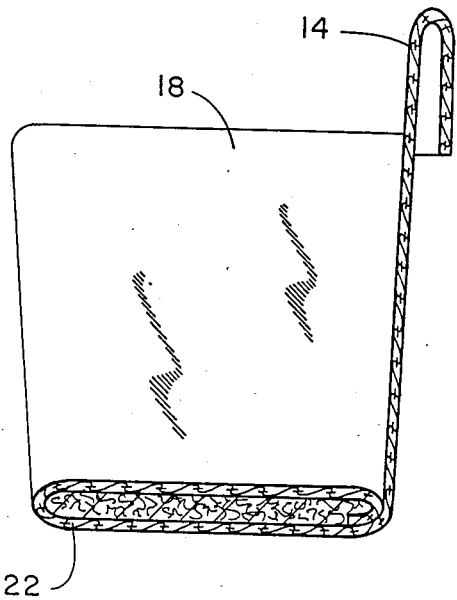
FIG. 15 is a cross sectional view taken along line 15—15 of FIG. 11.

As shown in the cross sectional view of FIG. 15, the seat bottom portion 22 is filled with a conventional padding material.

While the seat cover and handle cover of the present invention are preferably formed from a washable fabric material, it is to be understood that a flexible padded vinyl material may also be utilized in their construction, without departing from the scope of the present invention. It is essential however that the material utilized in the construction of both the handle cover and seat cover is sufficiently flexible to allow folding to a compact storage size.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved handle cover and seat cover for a shopping cart, comprising;
    a handle cover formed from an elongated rectangular piece of a flexible padded washable fabric material;
    an elastic fabric storage pouch on an upper surface of said handle cover, adjacent an end edge thereof;
    a snap fastener on an exterior surface of said elastic fabric storage pouch removably retaining a small squeeze toy;
    a snap fastener on said upper surface of said handle cover removably retaining a toy rattle;
    three spaced straps secured on said upper surface along one longitudinal side edge of said handle cover and extending transversely thereto;
    a plurality of hook VELCRO fasteners on an upper end of each of said straps;
    three spaced loop VELCRO fastening strips secured on a bottom surface of said handle cover along an opposite longitudinal side edge in alignment with said three spaced straps;
    a snap fastener on a central upper portion of each of said three spaced straps;
    a small clothes pin removably retained by said snap fastener on a middle one of said three spaced straps;
    a seat cover formed from a padded flexible washable fabric material;
    said seat cover having a back rest portion, two opposed side panel portions and a bottom seat portion;
    a snap fastener on an outer surface of an upper outer front corner of each of said side panel portions; and
    a pair of fastening straps, each having a snap fastener at each end, said fastening straps removably retaining said opposite seat cover side panel portions to two outer ones of said three spaced handle cover straps.

2. A new and improved handle cover and seat cover for a shopping cart, comprising:
- an elongated rectangular piece of a flexible padded washable fabric material;
- an elastic fabric storage pouch on an upper surface of said fabric material adjacent an end edge thereof;
- a snap fastener on an exterior surface of said elastic fabric storage pouch removably retaining a small squeeze toy;
- a snap fastener on said upper surface of said handle cover removably retaining a toy rattle;
- three spaced straps secured on said upper surface along one longitudinal side edge of said handle cover and extending transversely thereto;
- a plurality of hook VELCRO fasteners on an upper end of each of said straps;
- three spaced loop VELCRO fastening strips secured on a bottom surface of said handle cover along an opposite longitudinal side edge in alignment with said three spaced straps;
- a snap fastener on a central upper portion of each of said three spaced straps; and
- a small clothes pin removably retained by said snap fastener on a middle one of said three spaced straps.

* * * * *